United States Patent Office 2,818,390
Patented Dec. 31, 1957

2,818,390
HALOGENATED CARBANILIDES

David J. Beaver, Richmond Heights, and Paul J. Stoffel, Florissant, Mo., assignors to Monsanto Chemical Company, St. Louis, Mo., a corporation of Delaware No Drawing. Application April 16, 1954
Serial No. 423,821

10 Claims. (Cl. 260—553)

This invention relates to new and useful halogenated carbanilides and to the process for making same.

The new compounds of this invention may be represented by the general formula

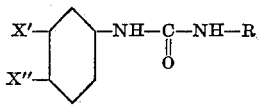

where R is a halogenated aromatic hydrocarbon radical and wherein X' and X'' are like or unlike halogen atoms of the group consisting of chlorine or bromine. Examples of R are 2-chlorophenyl; 3-chlorophenyl; 4-chlorophenyl; 3-bromophenyl; 4-bromophenyl; 2,4-dichlorophenyl; 2,3-dichlorophenyl; 3,4-dichlorophenyl; 3,4,5-trichlorophenyl; 3,4,5-tribromophenyl; 3-chloro-4-methylphenyl; 4-chloro-3-methylphenyl; 4-chloro-2-methylphenyl; 3,5-dichloro-4-methylphenyl; 4-chloro-3,5-dimethylphenyl; 3 - chloro-4-ethylphenyl; 3-chloro-4-isopropylphenyl; 3 - chloro - 4-n-butylphenyl; 3-chloro-4-tert. butylphenyl; the various chlorobiphenylyls such as 3-chloro-4-biphenylyl and 3-chloro - 4 - (4 - chlorophenyl)phenyl; the various chloroindenyls, the various chloronaphthyls and the like. While R may be any mono- or poly-halogenated aromatic hydrocarbon radical, it is preferable that R contain not more than three halogen substituents which may be like or unlike and which preferably are of the group consisting of bromine and chlorine. Of the new compounds of this invention those wherein R is a halogenated aromatic hydrocarbon radical free of ortho substituents (i. e. the 2- and 6-positions being unsubstituted) are particularly preferred.

As illustrative of the new compounds and the preparation thereof is the following:

EXAMPLE I

To a suitable reaction vessel equipped with a thermometer, agitator and reflux condenser and containing 8.1 parts by weight (substantially 0.05 mol) of 3,4-dichloroaniline in approximately 57 parts by weight of diethyl ether is added dropwise a solution of 7.7 parts by weight (substantially 0.05 mol) of 4-chlorophenyl isocyanate in approximately 15 parts by weight of diethyl ether at such a rate so as to maintain gentle reflux. Upon completion of the isocyanate addition the reaction mass is agitated for about one hour. The mass is filtered and the residue washed with diethyl ether. The dried product is a white fluffy solid which on recrystallization from ethanol gives fine white plates of 4,3',4'-trichlorocarbanilide, M. P. 255.2–256.0° C. (88.0% yield).

Employing the above procedure but replacing 3,4-dichloroaniline with 3,4-dibromoaniline, 4-chloro-3',4'-dibromocarbanilide is obtained.

EXAMPLE II

To a suitable reaction vessel is added and intimately mixed for about six hours at room temperature 8.1 parts by weight of 3,4-dichloroaniline, approximately 72 parts by weight of diethyl ether, and approximately 7.7 parts by weight of 2-chlorophenyl isocyanate. The mass is filtered and the residue washed with diethyl ether. The dried product is a white solid which on recrystallization from ethanol gives white needles of 2,3',4'-trichlorocarbanilide, M. P. 220.0–220.6° C. (88% yield).

EXAMPLE III

To a suitable reaction vessel is added and intimately mixed for about one hour at room temperature 8.1 parts by weight of 3,4-dichloroaniline, approximately 72 parts by weight of diethyl ether and approximately 7.7 parts by weight of 3-chlorophenyl isocyanate. The mass is filtered and the residue washed with diethyl ether. The dried product is a white solid which on recrystallization from ethanol gives white needles of 3,3',4'-trichlorocarbanilide, M. P. 210.7–211.3° C. (92.0% yield).

Employing the above procedure but replacing 3,4-dichloroaniline with 3-chloro-4-bromoaniline, 3,3'-dichloro-4'-bromocarbanilide is obtained.

EXAMPLE IV

To a suitable reaction vessel is added and intimately mixed for about one hour at room temperature 4.3 parts by weight of 3,4-dichloroaniline, approximately 72 parts by weight of diethyl ether, and approximately 5.0 parts by weight of 3,4-dichlorophenyl isocyanate. The mass is filtered and the residue washed with diethyl ether. The dried product is a white solid which on recrystallization from ethanol gives white granules of 3,4,3',4'-tetrachlorocarbanilide, M. P. 281–282° C. (100% yield).

EXAMPLE V

To a suitable reaction vessel is added and intimately mixed for about two hours at 35° C. 5.3 parts by weight of 3,4,5-trichloroaniline, approximately 72 parts by weight of diethyl ether, and approximately 5.0 parts by weight of 3,4-dichlorophenyl isocyanate. The mass is filtered and the residue washed with diethyl ether. The dried product is a white solid which on recrystallization from ethanol gives white needles of 3,4,5,3',4'-pentachlorocarbanilide, M. P. 308–309° C. (90.1% yield).

In the preparation of the new compounds of this invention other inert solvents than diethyl ether may be employed, e. g. di-isopropyl ether, methylbutyl ether, the liquid alkanes and the like. The reaction temperatures employed in preparing the new compounds will depend upon the particular reactants and in general will be between room temperature and the reflux temperature of the system.

The compounds of this invention of the general formula:

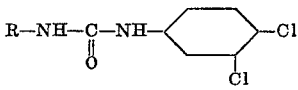

wherein R is a mono-chlorinated benzenoid hydrocarbon radical free of ortho substituents have been found to have outstanding antiseptic properties in detergent soap formulations. As illustrative of such 3,3',4'-trichlorocarbanilide and 4,3',4'-trichlorocarbanilide were compared to 4,4' - dichlorocarbanilide, 4,2',4' - trichlorocarbanilide (M. P. 253–253.8° C.) and 2,4,2',4'-tetrachlorocarbanilide (M. P. 261–263° C.) by incorporating in an "Ivory" brand neutral high grade white soap (a mixture of 80% sodium soap and 20% potassium soap produced from a 70% tallow and 30% coconut oil glyceride blend in accordance with U. S. 2,295,594), respectively, in a weight ratio of one part to 50 parts by weight soap. Aliquots of each were added to a Sabourard's dextrose agar medium so as to give concentrations of 10, 1 and 0.1 part per million of the respective compounds in the agar. The agar in each case was then poured into a petri dish, allowed to harden and then inoculated with a standard culture of *Micrococcus pyogenes* var. *aureus* of standard resistance. The incubation in each instance was made simultaneously at 37° C. for 48 hours. The extent of growth is noted below:

Table I

| Concentration, p. p. m. | 10 | 1 | 0.1 |
|---|---|---|---|
| 4,4'-dichlorocarbanilide | heavy | heavy | heavy. |
| 3,3',4'-trichlorocarbanilide | none | none | none. |
| 4,3',4'-trichlorocarbanilide | none | none | none. |
| 4,2',4'-trichlorocarbanilide | heavy | heavy | heavy. |
| 2,4,2',4'-tetrachlorocarbanilide | heavy | heavy | heavy. |

Relatively small amounts of these trichlorocarbanilides in a detergent soap composition have been found to yield effective antiseptic detergent soap compositions. Amounts as low as 0.5 to 1% by weight based upon the weight of the detergent soap have proved satisfactory in some instances. However, it is preferred to employ these trichlorocarbanilides in amounts in the order of 1 to 3% by weight based on the detergent. While larger amounts, as for example up to 10% by weight, may be employed the upper limit will be determined by practical considerations. Various colors, antioxidants, perfumes, water softeners, emollients, and the like may be included where desirable in detergent compositions containing these new trichlorocarbanilides. The term "soap" or "detergent soap" as used herein is employed in its popular or ordinary meaning, i. e. those cleansing compositions prepared from an alkali metal compound such as potassium or sodium hydroxide and a fat or fatty acid, both saturated and unsaturated.

While this invention has been described with respect to certain embodiments it is not so limited and it is to be understood that variations and modifications thereof obvious to those skilled in the art may be made without departing from the spirit or scope of this invention.

What is claimed is:
1. Halogenated carbanilides of the structure

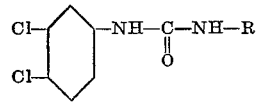

where R is a chlor-substituted benzenoid hydrocarbon radical free of substituents ortho to the —NH— group, said chlor substituents totalling not more than three.

2. Halogenated carbanilides of the structure

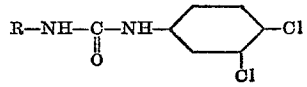

where R is the mono-chlorphenyl radical C₆H₄Cl— free of substituents ortho to the —NH— group.

3. 3,3',4'-trichlorocarbanilide.
4. 4,3',4'-trichlorocarbanilide.
5. 3,4,3',4'-tetrachlorocarbanilide.
6. 3,4,5,3',4'-pentachlorocarbanilide.
7. The method of making a halogenated carbanilide of the structure

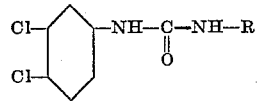

where R is a mono-chlorinated phenyl radical which comprises reacting 3,4-dichloroaniline with a mono-chlorophenyl isocyanate free of ortho substituents in the presence of an inert organic solvent at a temperature between room temperature and the reflux temperature of the system.

8. The process of claim 7 wherein the mono-chlorophenyl isocyanate is 3-chlorophenyl isocyanate.
9. The process of claim 7 wherein the mono-chlorophenyl isocyanate is 4-chlorophenyl isocyanate.
10. The method of making a halogenated carbanilide of the structure

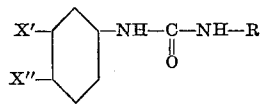

where X' and X" are chlorine atoms and where R is a chlor-substituted benzenoid hydrocarbon radical free of substituents ortho to the nitrogen atom, said chlor substituents totalling not more than three, which comprises reacting at a temperature in the range of room temperature to the reflux temperature of the system a compound of the structure

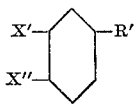

with a compound of the formula R—R" in the presence of an inert organic solvent, in the said reagents X, X" and R have the same significance as above and R' and R" are unlike radicals selected from the group consisting of —NH₂ and —N=C=O.

References Cited in the file of this patent

UNITED STATES PATENTS 2,376,930   Martin _____ May 29, 1945

OTHER REFERENCES

Jour. Amer. Chem. Soc., 56, 680–1 (1934).